(12) United States Patent
Englander

(10) Patent No.: US 6,636,822 B2
(45) Date of Patent: Oct. 21, 2003

(54) METHOD FOR TESTING VEHICULAR MIRRORS FOR REGULATORY COMPLIANCE USING ARTIFICIAL VISUALIZATION

(75) Inventor: Benjamin Englander, Jamaica, NY (US)

(73) Assignee: Rosco Inc., Jamaica, NY (US)

( * ) Notice: Subject to any disclaimer, the term of this patent is extended or adjusted under 35 U.S.C. 154(b) by 0 days.

(21) Appl. No.: 10/053,095

(22) Filed: Jan. 17, 2002

(65) Prior Publication Data

US 2003/0135342 A1 Jul. 17, 2003

(51) Int. Cl.[7] .......................... G01D 3/00; G01M 19/00; G01P 21/00

(52) U.S. Cl. ................................................ 702/108

(58) Field of Search ................................. 702/116, 155, 702/159, 182, 186, 108

(56) References Cited

U.S. PATENT DOCUMENTS

| 4,120,582 A | * | 10/1978 | De Vries | ..................... 356/73 |
| 5,621,520 A | * | 4/1997 | Hoffman | ................... 356/124.5 |
| 5,642,236 A | * | 6/1997 | Mazurek | ..................... 359/840 |

OTHER PUBLICATIONS

Kraus, Harold, Designing and Evaluating rear view Mirrors by Computer, 1969, Society of Automotive Engineers, Inc.*
Carfagni,M., A Rendering–based CAD Method for the Design and Testing of Rearview Mirrors, 2002, Kluwer Academic Publisher.*
Case, K. Design of Mirror Systems for Commerical Vehicles, 1981, Automotive Engineer.*

* cited by examiner

Primary Examiner—Kamini Shah
Assistant Examiner—Demetrius Pretlow
(74) Attorney, Agent, or Firm—Ostrolenk, Faber, Gerb & Soffen, LLP

(57) ABSTRACT

A method and system for facilitating the certification process for school bus mirrors, especially cross-view school bus mirrors, using artificial visualization. The method of the invention qualifies and certifies the field of view coverage of mirror systems for compliance with predetermined criteria, and comprises the steps of: defining to a first software facility the dimensions and physical configuration of a vehicle, adding a definition and location of at least one prototype mirror, including data that defines the shape of the prototype mirror. A second software facility, coupled to the first software facility, traces light rays to synthesize and model an image reflected from the surface of the prototype mirror, which then is used to detect a plurality of physical objects at predefined distances relative to the vehicle and visualizing those physical objects on the prototype mirror artificially.

7 Claims, 3 Drawing Sheets

METHOD FOR TESTING VEHICULAR MIRRORS FOR REGULATORY COMPLIANCE USING ARTIFICIAL VISUALIZATION

BACKGROUND OF THE INVENTION

The present invention is generally directed to a method for testing mirrors and, more particularly, to a method and process for testing mirrors for compliance with regulatory requirements using artificial visualization techniques.

Many types of vehicles are statutorily or regulatorily required to have various rear view and other types of mirror systems. School buses, in particular, pose a special challenge. In addition to the usual complement of mirrors, they are required to include so-called cross-view mirrors which are typically highly convex mirrors that are mounted on the front fenders of the school bus. Each such mirror is capable of providing views both alongside of the bus and over a portion of the front space as well. A pair of such cross-view mirrors mounted on the right and left-hand corners of the front fenders provides a full panoramic view alongside the sides and the front space faced by the driver of the bus.

Cross-view and rear view mirrors must be certified to comply with strict regulatory requirements. One such a requirement comprises the Federal Motor Vehicle Safety Standard FMVSS 111 regulations. The certification process is quite detailed and laborious. It involves the placement of a series of cylinders of a specified size alongside and in front of the bus at precisely prescribed distances from the bus in a prescribed arrangement. Each of a pair of cross-view mirrors must be capable of reflecting an image of a certain size of the cylinders for the mirror to be certified as being in compliance.

The test itself requires the mounting of prototype mirrors on the bus, the driving of a bus to a test site, the placement of the cylinders and the gathering of data. If the criteria for certification are not met, the mirror assembly, the mirror surface contour or the overall size of the mirror must be redesigned and the entire test repeated. Yet, this laborious and time intensive process has been in use for decades by the industry and still is used today.

SUMMARY OF THE INVENTION

Accordingly, it is an object of the present invention to provide a method for facilitating the certification process for mirrors.

It is another object of the invention to provide a more efficient and speedier process for the design and testing of mirrors.

It is yet another object of the present invention to provide a mirror testing facility that has a greater integrity and that permits third parties to verify and easily confirm the test results obtained by another party.

The foregoing and other objects of the invention are realized with the method and process of the invention which serves to qualify and certify the field of view coverage of mirror systems for compliance with predetermined criteria, comprising the steps of:

defining to a first software facility the dimensions and physical configuration of a vehicle;

adding a definition and location of a prototype mirror having a reflecting surface mounted to the vehicle;

supplying to the first software facility data which defines the shape of the prototype mirror;

coupling with the first software facility a second software facility that traces light rays to synthesize and model an image reflected from the reflecting surface of the prototype mirror;

supplying to the first software facility data which define a plurality of physical objects placed around the vehicle at predefined distances and locations relative to the vehicle; and certifying that a mirror is in compliance based on the modeled appearance in the prototype mirror of the physical objects.

Other aspects of the invention implicate software facilities that enable the changing of mirror surfaces while the test is being performed to optimize the mirror's shape, or modeling movement of the vehicle relative to the physical objects and calculating optimal mirror positions and orientations on a mirror pole that is mounted to the vehicle.

It is a particular advantage of the invention to facilitate the certification and testing of cross-view mirrors.

Other features and advantages of the present invention will become apparent from the following description of the invention which refers to the accompanying drawings.

DETAILED DESCRIPTION OF THE DRAWINGS

Figure 1:
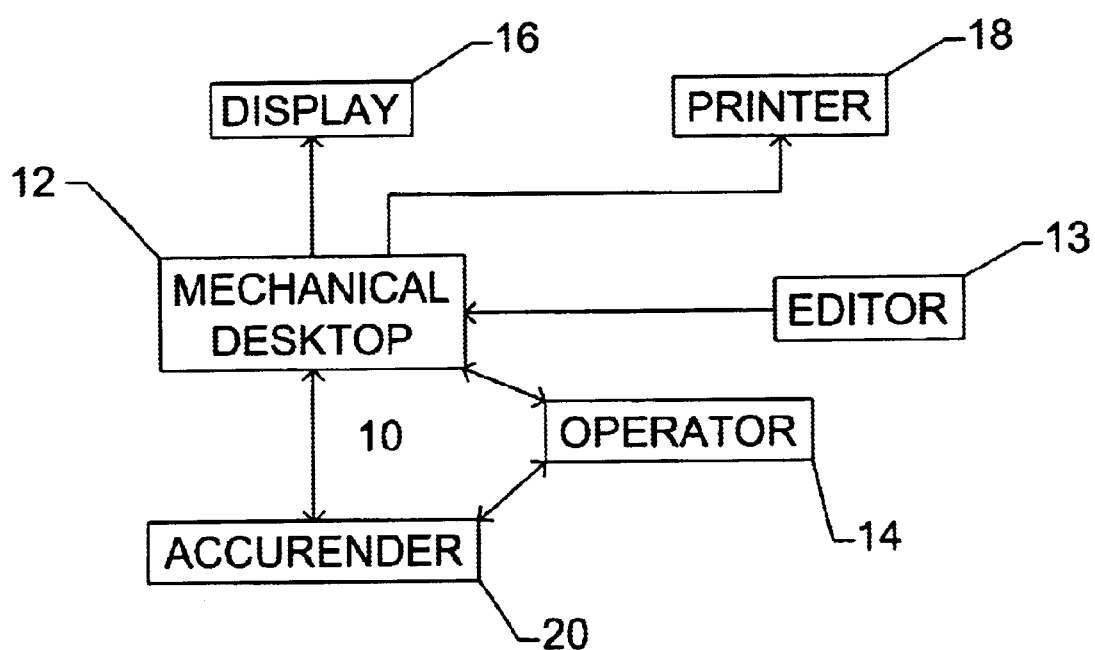
FIG. 1 is a general block diagram of the present invention.

From the perspective of basic hardware and software, the structural constituents of the invention are not unconventional. With reference to FIG. 1, the invention deploys any of a variety of three-dimensional solid modeling computer-aided design software packages, such as the mechanical desktop package identified as 12 in FIG. 1, which comprises a software package operable by an operator 14 to virtually create within a computer a depiction and definition of any three-dimensional or of a variety of three-dimensional objects that can be enlarged, rotated, pivoted, etc., and subsequently displayed on a display 16 or physically recorded via a printer 18.

Since the invention deals with the subject of automotive or vehicular mirrors, the invention further deploys a software package which is coupled with the mechanical desktop package 12, which in one form can be the commercially available AccuRender package 20 that is capable of tracing or depicting the image that would appear on a reflective surface, by tracing light rays relative to overall objects that are defined by mechanical desktop package 12.

A generalized, specification-oriented description of one example of commercially available software packages that can be used to implement the mechanical desktop package 12 and the AccuRender 20 product is presented below.

Mechanical Desktop 6 is a product of Autodesk, Inc., San Rafael, Calif. According to its promotional literature, it has Autodesk STEP and IGES translators for quick, efficient sharing of designs with different CAD systems. The Autodesk® Feature Exchange add-on module transforms static solid models into parametric parts with native Mechanical Desktop features, to speed editing and workflow. Intelligent production drawing and detailing, large standard mechanical part libraries and compliance with industry design standards are all included in Autodesk Mechanical Desktop. Designing assemblies and complex parts is facilitated by the comprehensive Spring Generator and Hole Charts feature. And the BOM and Parts lists tools are enhanced to help conform to one's company standards.

Autodesk Mechanical Desktop supports the sharing of 2D and 3D design data with Autodesk Streamline. This secure hosted service makes instant collaboration possible with persons on an extended manufacturing team, inside or outside one's company. One can quickly create accounts, invite project members and publish designs in minutes to share with others. And Mechanical Desktop supports designer-to-designer collaboration with features like Meet Now and eTransmit and designer-to-community collaboration via Autodesk® Point A, the Publish to Web feature and i-drop™ technology.

Standards compliance, process data exchange and easy integration are benefits of software built on AutoCAD. License network technology simplifies managing network licenses, and one can switch easily between network and stand-alone licenses to work remotely. And Autodesk Mechanical Desktop outputs native DWG, the most widely used file format in the industry.

The Mechanical Desktop software allows one to and/or comprises the following features:

Edit base parts using AutoCAD solids editing commands.

Derive parametric features from non-parametric solids with Autodesk® Feature Exchange add-on utility.

Create parametric threads on internal or external faces with Thread feature.

Quickly customize thread data and document drawing holes and hole notes with improved Hole feature.

Explode scenes for subassemblies with Scene Enhancements.

Quickly generate notes that are fully associative to the part they document.

Develop models from separate surfaces with smooth transitions; ensure tangent and optional curvature continuity at surface edges.

Design without specifying structure or defining constraints and reorganize assembly hierarchy without losing constraints and drawing references.

Edit external subassemblies and combined parts in place for true top-down design capabilities.

Reference variable dimensions in the BOM so values update automatically.

Use BOM variables to generate cut lists.

Accurately represent 3D standard parts in 2D drawing views.

Capture design intent—extrusions, sweeps, lofts, and revolved parts—using robust, flexible termination types.

Automate compliance with company drafting standards using Externalize with a Template feature.

Control properties of detail views while maintaining full associativity with parent views with Independent Detail Views.

Make patterned instances become independent with Independent Pattern Instance.

Create balloons more flexibly and base cut lists on a company standard parts list with Bill of Material and Balloons.

Combining like items into a consolidated list with Grouping of a Parts list; combine selected items to calculate total length required for stock ordering.

Publishing to Autodesk Streamline for instant sharing of design data across the extended manufacturing team optimizes your product development process.

Autodesk Point A keeps up-to-date with industry news.

i-drop technology allows intelligent dragging of web content into drawings.

Standard Parts comprise more than 600,000 parts including screws, nuts, washers, and pins in 18 standards.

Standard Features comprise nearly 8,000 features including centerholes, undercuts, keyways, and thread ends.

Standard Holes comprise over 20,000 holes.

Standard Structural Steel Shapes comprise thousands of predrawn shapes.

Screw Connection builds the entire fastener assemblies from a selected screw.

Spring Generator selects, calculates, and inserts compression, extension, tension springs and Belleville spring washers.

Shaft Generator creates 2D shafts including centerholes, chambers, and cones—plus bearings, gears and other standard parts.

Belt and Chain Generator creates pulleys and sprockets, inserts chain or belt elements, and calculates their lengths.

Use integrated STEP translator for easy design conversion.

Reduce problems with drawing view scales other than 1:1-2D View Out enhancements provide greater control and accuracy for output data.

Creates parts from multiple solids with automated Solid to Part Conversion.

Automatically generate associative views including aligned, orthographic, isometric, broken, user-defined and many more.

Exchange data in numerous formats including BMP, CPS, DWE, DWG, DXP™, IDF, IGES, VDA-FS (bonus utility), VRML, STEP, SAR (ACIS) SIL, WMF, 3DS (3D Studio®), XGL and ZGL.

The AccuRender commercially available software is a product of Robert McNeel & Associates, Seattle, Wash. According to its promotional literature, it creates life-like images from 3-D models inside AutoCAD R14 and 2000, Architectural Desktop, Mechanical Desktop, Revit or Rhino.

AccuRender uses raytracing and radiosity technologies to create high quality, photorealistic, still, panorama, and animation image files.

AccuRender provides high image quality, accuracy, speed, and ease-of-use. With AccuRender, one can apply materials and lights to models.

AccuRender provides indirect lighting calculation, soft shadows, color bleeding, and lighting analysis tools. Raytracing provides accurate reflection, refraction, caustics, shadows, and other facilities that promote realism.

AccuRender is said to be faster than other radiosity and raytrace renderers. AccuRender 3 supports multiprocessors and background processing. Scenes in AccuRender can be set up in one tenth the time needed for most other renderers.

AccuRender can be interrupted while processing to revise material assignments or lighting. One is not forced to wait for the entire process to complete before being able to view the image.

AccuRender does not need a professional to render or a lighting engineer to get realistic results quickly. Physically-based light source intensities are specified in watts, lumens, or candelas throughout. AccuRender materials are assigned to layers or objects. No other steps are needed.

With AccuRender, because one works in a modeling application, learning cost is minimal. Hardware requirements are the same as in modeling applications. Virtual reality is completely interactive viewing of fully rendered models, even on a basic PC or across the Internet.

With other conventional radiosity-based renderers, if one changes the model, he or she must start over and reapply materials and lighting. With AccuRender, everything is saved in AccuRender.

AccuRender extends the capabilities of familiar modeling software.

Over 5,000 materials, 500 plants and 300 light fixtures are included with AccuRender. Additionally, AccuRender provides a materials editor to enable creating one's own specialized materials from bitmaps or procedural patterns.

Most renderers rely entirely on bitmap materials that must be tediously "mapped" on to each object. AccuRender supports bitmap and procedural materials like marble, granite, tile and wood that can be assigned to objects, blocks, or layers. Procedural materials penetrate through the part instead of being "wrapped" around it. A wood beam will show a rift saw grain pattern on the sides and end grain on the end. The growth rings penetrate through the beam like real wood instead of being wrapped around it like shelf paper.

Over 500 species of mathematically generated 3-D plants with seasonal variation are included with AccuRender. Most other products paste on simple bitmaps, giving unrealistic shadows and reflections. Realistic 3-D trees and plants are "grown" in memory at the time of rendering to produce life-like results.

Figure 2:
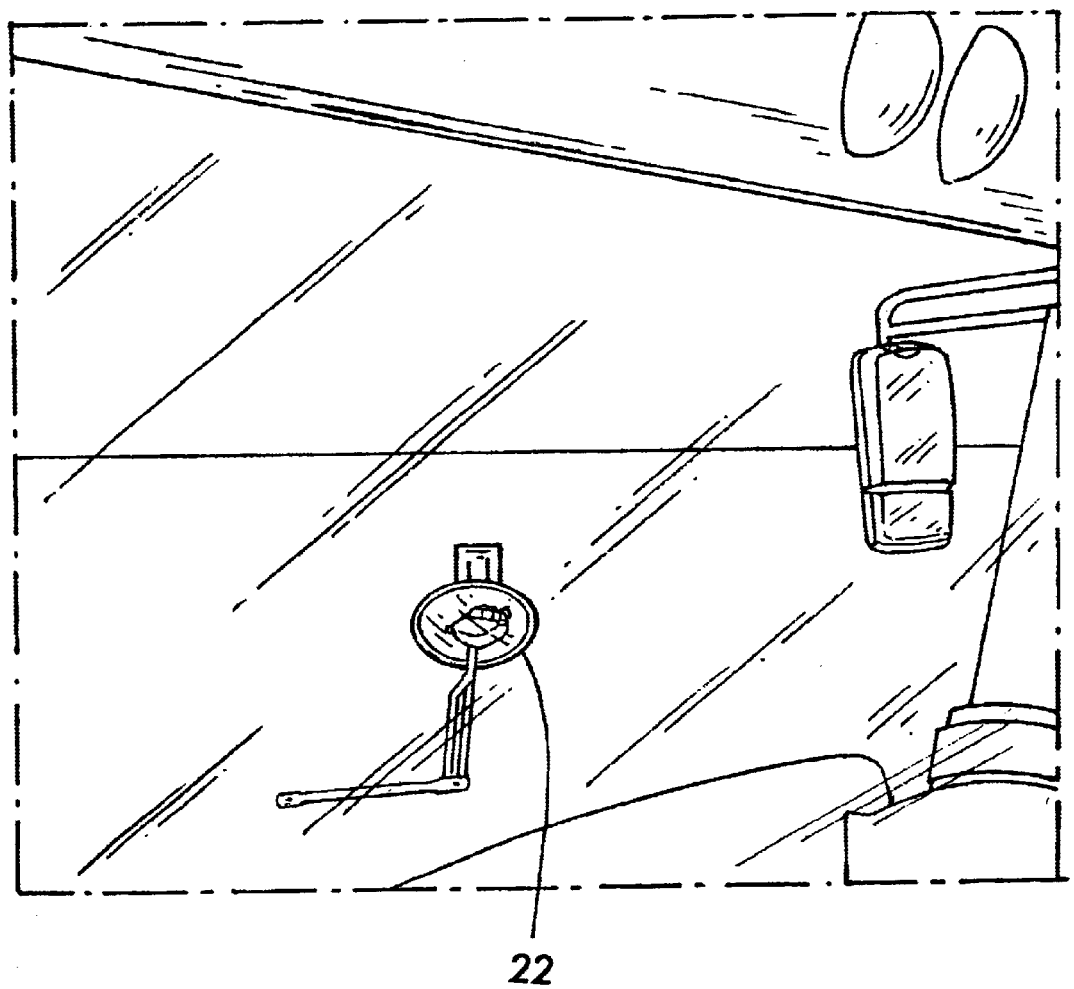
FIG. 2 is a first more panoramic view obtained with the system and method of the present invention.
Figure 3:
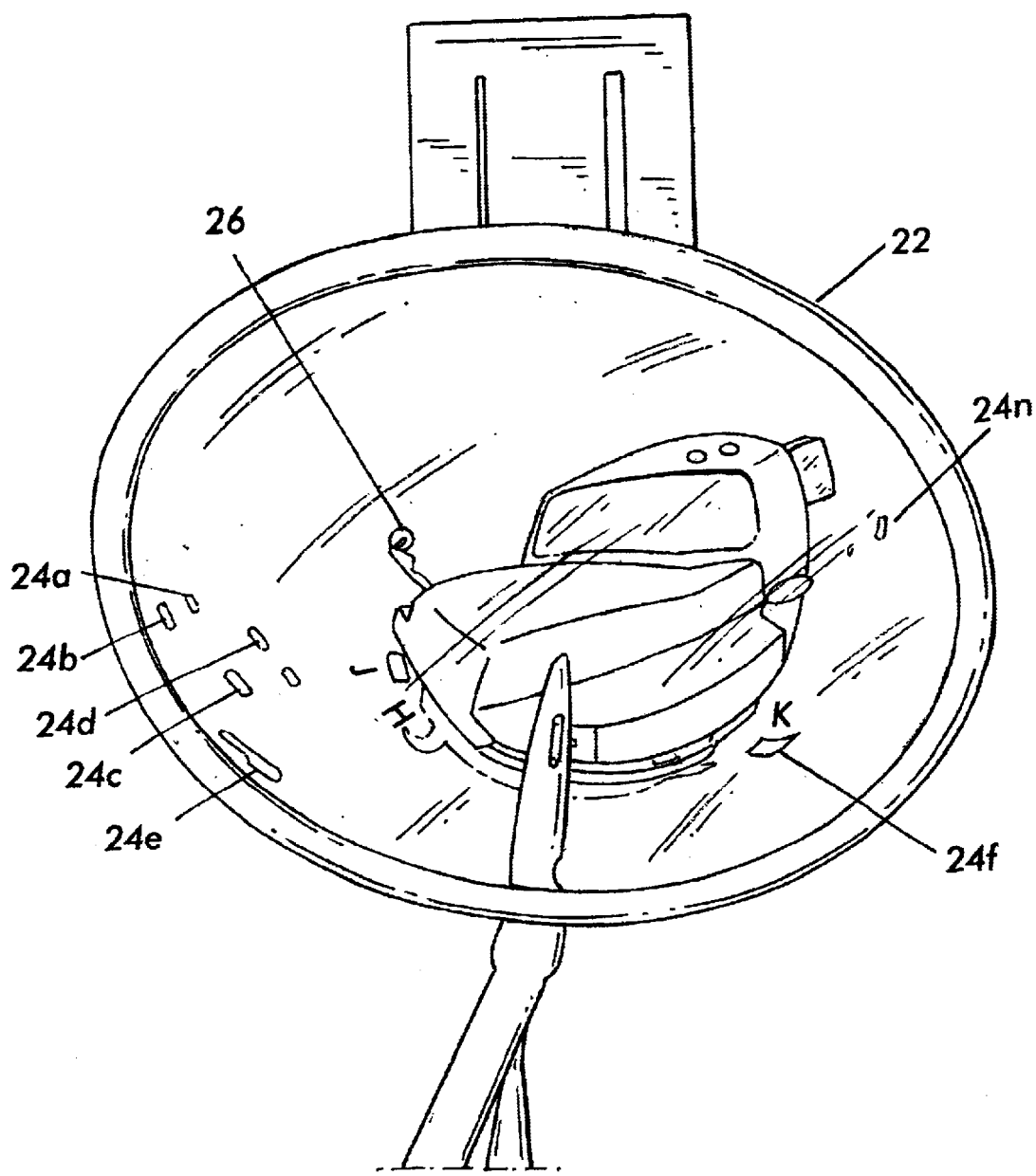
FIG. 3 is a close-up rendition of the visual effects of the present invention, obtained directly from a simulated mirror mounted on the left-hand side, on the fender of a school bus.

Using the aforementioned components and defining to the Mechanical Desktop software, the dimensions of a schoolbus, including the locations of poles for cross-view mirrors, for example, the mirror 22 shown in FIG. 2, the overall construction of the present invention will automatically render on the mirror, a visual rendition of what would be reflected in the mirror when it is mounted on the bus at the location specified to the Mechanical Desktop software package 12. In this case, one can specifically discern, the series of cylinders 24a, 24b, 24c, . . . 24n spacedly arranged around the school bus. A similar rendition (not shown) is obtained for the second mirror 26 located on the right-hand side relative to the bus driver.

The invention may also include other software, such as an editing package 13 that enables a user to instruct the mechanical desktop software to automatically change the contour of the mirror 22 in a manner that will include specified locations in and about the schoolbus. The same package also calculates optimal mirror positions and configurations and can be dynamically configured, so that when the bus moves relative to the cylinders, the image constantly changes on the reflecting surface of the mirror.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for testing vehicular mirrors for regulatory compliance using artificial visualization, comprising the steps of:
    defining to a first software facility the dimensions and physical configuration of a vehicle;
    adding a definition and location of a prototype mirror mounted to the vehicle;
    supplying to the first software facility, data which defines the shape of the prototype mirror;
    coupling with the first software facility, a second software facility that comprises a facility that traces light rays to synthesize and model an image reflected from a reflecting surface of the prototype mirror;
    supplying data to the first software facility which define a plurality of physical objects placed around the vehicle at predefined distances and locations relative to the vehicle; and
    certifying that a mirror is in compliance based on the reflected appearance in the prototype mirror of the physical objects.

2. The method of claim 1, wherein the vehicle is a schoolbus.

3. The method of claim 1, wherein the physical objects are cylindrically-shaped.

4. The method of claim 1, including operating a software package that simulates the vehicle moving relative to the physical objects and the second software package constantly altering the image on the prototype mirror to account for such movement.

5. The method of claim 1, further including operating a software package that automatically chooses altered mirror surface shapes and configurations that have the effect of including within a reflected image on the mirror surface, the physical objects located at a periphery of the prototype mirror.

6. The method of claim 1, including mounting a first prototype mirror on a left-hand front fender of a school bus and mounting a second prototype mirror on a right-hand side of a school bus.

7. The method of claim 6, wherein the first prototype mirror and the second prototype mirror are modeled as convex lens mirrors having a peripheral oval shape.

* * * * *